Figure 1:
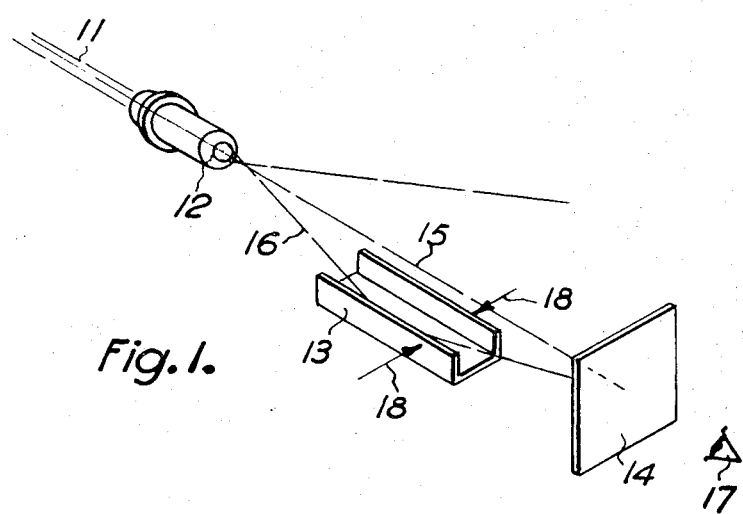

United States Patent
Burch et al.

[11] 3,823,604
[45] July 16, 1974

[54] METHOD OF AND APPARATUS FOR DETECTING SURFACE FORM IRREGULARITIES

[75] Inventors: James Morriss Burch; Raymond John Wilton, both of Teddington; Colin David Reid; Michael Richard Wall, both of Aldermaston, all of England

[73] Assignee: Holotron Corporation, Columbus, Ohio

[22] Filed: Aug. 4, 1972

[21] Appl. No.: 278,049

Related U.S. Application Data
[63] Continuation of Ser. No. 557,452, June 14, 1966, abandoned.

[30] Foreign Application Priority Data
June 15, 1965   Great Britain.................... 25269/65

[52] U.S. Cl.............. 73/71.3, 350/3.5, 356/106 R, 356/109
[51] Int. Cl. ............................................ G01n 1/18
[58] Field of Search............ 73/67.5 H, 71.3, 432 L; 350/3.5; 356/106, 109

[56] References Cited
UNITED STATES PATENTS
3,083,615   4/1963   El-Sum..................... 73/67.5 H UX OTHER PUBLICATIONS
Leith et al., Wavefront Reconstruction with Diffuse Illumination and Three-Dimensional Objects, Journal of The Optical Society of America, Nov. 1964, pp. 1295-1301

Burch, The Application of Lasers in Production Engineering, Pub. by the Institution of Production Engineers, June 15, 1965, as the 1965 Viscount Nuffield Memorial Papers, pp. 1-12

Powell et al., Interferometric Vibration Analysis of Three Dimensional Objects by Wavefront Reconstruction, Abstract of Paper in J. Opt. Soc. Am., Vol. 55, May 1965, P. 612

An Application of Wavefront Reconstruction to Interferometry, Horman, Applied Optics, Vol. 4, No. 3 Mar. 1965, pp. 333-336

Archbold et al., Application of Holography to the Comparison of Cylinder Bores, Journal of Scientific Instruments, Vol. 44, 1967, pp. 489-491.

Redman et al., The Use of Holography to Measure the Position and Velocity of Rapidly Moving Objects, High Speed Photography–Proc. of the 8th International Congress–Stockholm, June 1968, pp. 317-320.

*Primary Examiner*—Richard C. Queisser
*Assistant Examiner*—John P. Beauchamp
*Attorney, Agent, or Firm*—Cushman, Darby & Cushman

[57]   ABSTRACT

Method of and apparatus for detecting surface form irregularities by means of the pattern of interference fringes produced when a three-dimensional image of a reference surface form is superimposed upon a surface form having such irregularity.

27 Claims, 7 Drawing Figures

METHOD OF AND APPARATUS FOR DETECTING SURFACE FORM IRREGULARITIES

This application is a continuation of application Ser. No. 557,452 filed June 14, 1966, now abandoned.

The present invention relates to the visual examination of objects (which term includes materials) for such purposes as the detection and measurement of small changes in shape or position or departures from a predetermined form (which may be comprehensively referred to as differences in surface form), whether caused by strains resulting from imposed loads, secular changes or even biological changes, or inaccuracies in manufacture. The method employed by the invention avoids the imposition of anything but infinitesimal loads on the object examined and it can be used for the examination of objects which are difficult of access such as the interior of a transparent vessel under pressure or vacuum or the interior of a narrow bore. Only light rays need to fall on the object and the equipment can be out of contact with it, apart from some form of support to hold it in position.

The invention makes use of the recording of diffraction patterns of at least part of the surface form of an object illuminated by coherent light, together with a background of coherent light, and the subsequent reconstruction of a complete three-dimensional image of the relevant part of the object. The method requires an intense source of highly coherent light such as it is now possible to obtain from a laser and was originally devised by Gabor, Proc. Roy. Soc. (London) A 197,454 (1949) and subsequently further developed by Leith and Upatnieks, Journ, Opt. Soc. Am. 54, 1295 (1964). In one form of the developed method the object is placed in one part of a beam of coherent light, suitably a parallel beam, and a prism of small angle in the other part at the same location along the beam, disposed to deflect the light passing through it towards that continuing past the object. A fine grained photograph plate is set up where the two parts of the beam are in registration, and the interference pattern there produced is thereby recorded. If now the developed plate (the "hologram") is exactly replaced and the object removed, upon observation through the plate, again under illumination with sufficiently coherent light, with all the elements in exactly the same position, a complete three-dimensional image of the relevant part of the object will be seen at the position it occupied during recording.

It has now been found, and the invention also makes use of the fact, that interference effects can be obtained between an object and an image reconstructed from a corresponding/hologram by placing the object at an appropriate position in relation to the image. According to the invention a method of detecting small differences between at least part of the surface form of a test object at the time of detection and a reference surface form to which the said part of the surface form of the test object closely approximates, comprises preparing a hologram of the reference surface form, placing the test object with said part of its surface form as nearly as possible in the position exactly corresponding to that occupied by the reference surface form during the exposure of the hologram, reconstituting a three-dimensional image from the hologram while the test object is in position and observing the pattern of interference fringes between the image and the surface of the test object.

As a rule the reference surface form will be part of an actual object but in some cases, for example where an object to serve as a master is difficult to make with the necessary surface form, the hologram may be prepared from a simulated object. Thus a cylindrical surface may be simulated for the purpose from a plane surface by a rotation effected during the exposure and a parabolic surface by change of scale from a linear surface. Again two holograms may be prepared on one plate from two different objects to obtain the effect of one object within another, or a hologram may be prepared from an image of one surface reconstructed from a first hologram, with this image surrounding another real surface, or even from two holographic reconstructions. When the reference surface is part of an actual object, the test object and the object having the reference form can be one and the same object so that the object is compared with a reconstructed image of itself. However, provided, for reasons which will appear later, the test object has a substantial degree of specular reflection, the test object may be a replica of either an actual master object having the reference form or of a simulated master object. By replica is meant an object nominally having an identical form to the master object at least in the portion under examination.

The pattern of fringe maps the difference between the original recorded shape and the shape at the time of comparison, and can be dimensionally interpreted from the spacing and direction of the fringes and the parameters of the apparatus. The invention enables not only the permanent departures from original shape or position to be observed but also changes while they are occurring. The fringes can moreover be photographed by placing a camera in the position of the observer's eye, using ordinary coarse grained high speed material, for record purposes and for evaluation at leisure. It will be clear that interference fringes will be obtained only for wave front departures of the order of wave lengths of light, and the term closely approximates, used above, is intended to confine the scope of the invention to such cases.

Figure 2:
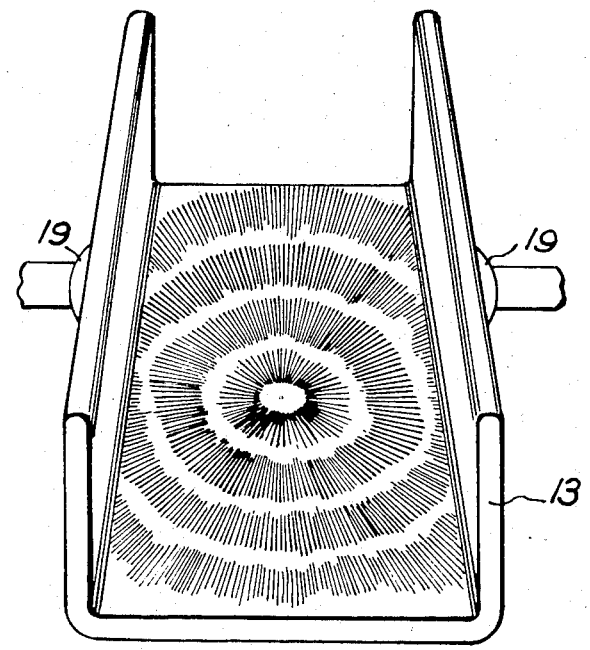
Figure 3:
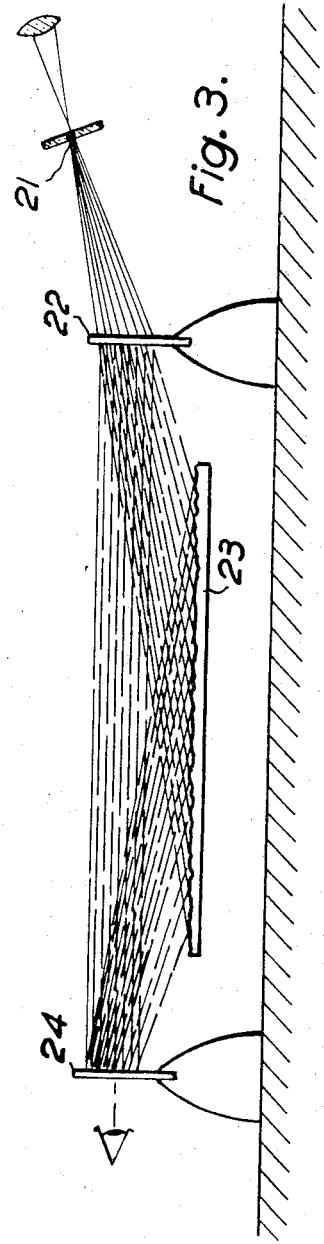
Figure 4:
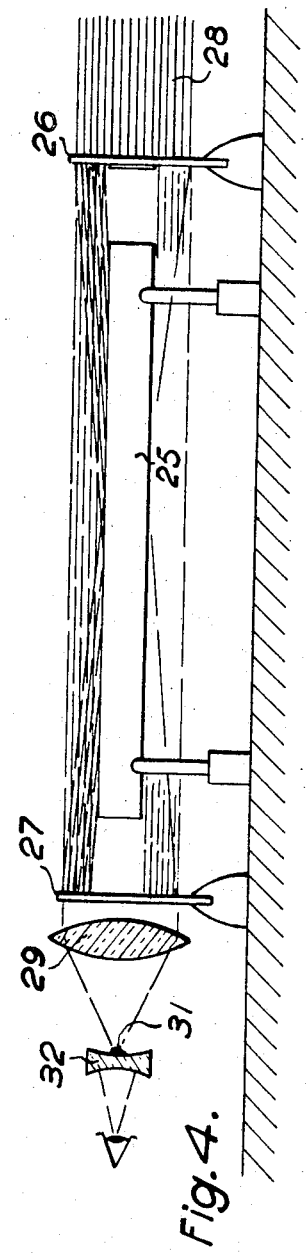
Figure 5:
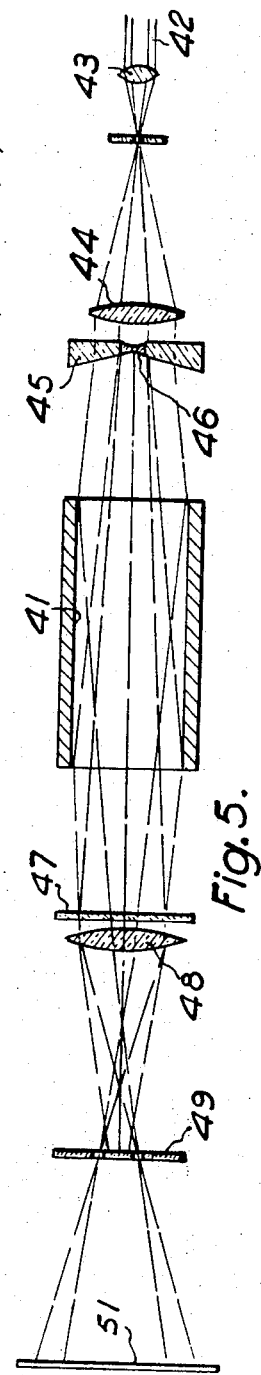
Figure 6:
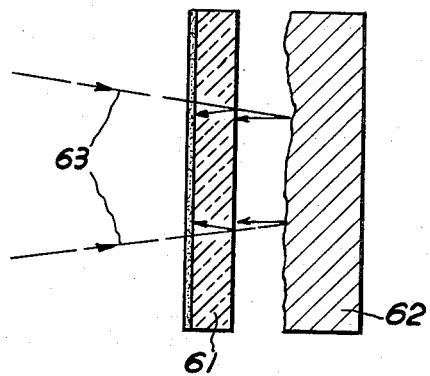
Figure 7:
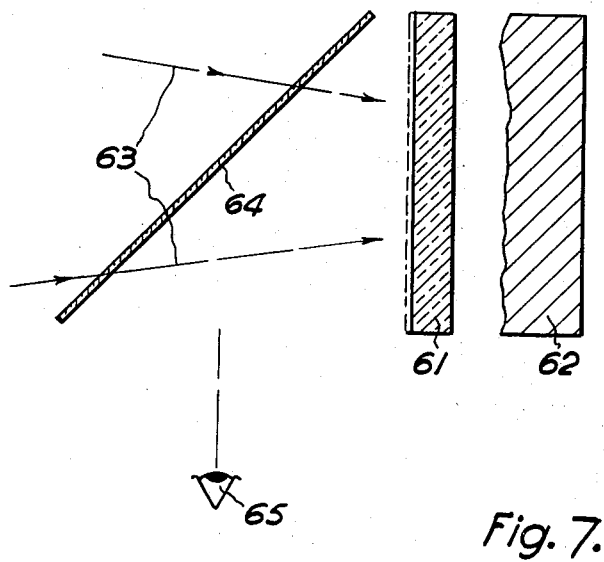

The invention will be further described with reference to the accompanying highly diagrammatic drawings in which FIG. 1 is a diagram illustrating the application of the invention to the examination of a specimen in the form of a piece of channel steel constituting a typical example, FIG. 2 illustrates the pattern of interference fringes obtained between the image reconstructed from a hologram prepared from a channel steel specimen at rest and the specimen slightly distorted by loading, FIG. 3 illustrates the application of the invention to examination of a flat or nearly flat object, FIG. 4 illustrates the application of the invention to examination of a cylindrical object, FIG. 5 illustrates the application of the invention to examination of a cylindrical bore and FIGS. 6 and 7 illustrate the application of the invention to examination of a substantially flat object bearing a shallow relief pattern.

Referring now to FIG. 1 the highly coherent beam 11 from a laser source not shown is passed through a lens 12, suitably a microscope objective, which causes the beam to be brought to a focus and then to diverge beyond. The specimen consisting of a length of channel steel 13 is set with its length parallel to the axis of the system but some distance from it. The very fine grain photographic plate on which the hologram is recorded is marked 14. It will be seen that some light represented by the ray 15 reaches the plate 14 directly while other light represented by the ray 16 at an angle to the ray 15 falls on the specimen and is thence diffusely reflected to the plate 14. At the plate, the direct and reflected rays produce an interference pattern which is recorded on the plate and after processing of the plate constitutes the hologram. If the specimen is removed, the hologram is exactly replaced and exactly the same illumination is used, on observing through the plate (the observer's eye being indicated at 17) a three-dimensional image of the specimen will be seen at the position previously occupied by the specimen and this image can be photographed by substituting a camera loaded with ordinary sensitive material for the eye 17.

If the specimen is replaced in exactly the same position but has suffered any minute changes of form, an interference pattern of fringes will be produced which represents the misfit between the three-dimensional image and the specimen. This pattern will be visible to the observer or can be photographed for subsequent study.

The fact that the surface of the specimen (in terms of wave lengths of light) is extremely rough and only diffusely reflecting does not prevent the above results being obtained but emphasises the need for precise replacement of the specimen if an interference pattern between the image and specimen is to be obtained. It will also be clear that the differences in fine surface detail between one piece of angle steel and another would prevent any or any useful interference pattern from being obtained if a different specimen were put in place when the image is formed.

A piece of channel steel is only one example and in general any specimen whatever short of an entirely black specimen can be examined in this way, though with different forms of specimen other lay-outs may be preferable. Some other examples are given later.

One type of small change in form of the specimen which is often of interest is the deflection caused by an applied load. FIG. 2 illustrates the effect of applying a load to the specimen 13 of FIG. 1 by the application of a compression force in the direction of the arrows 18 in FIG. 1. The force is applied through clamping members indicated at 19 in FIG. 2. As the force is varied the pattern of the fringes will be varied and the actual deflection can be evaluated from the number and spacing of the fringes, their form and the parameters of the apparatus.

Instead of separately recording the fringe pattern due to deflection, this can be recorded on the original plate 14. A first exposure is made with the specimen at rest, just as above described. The deflecting force is then applied to the specimen and a further exposure is made on the same plate. This when processed will contain a dual hologram and the image reconstructed from it will show both the specimen and the fringe pattern just as in FIG. 2. This process can in fact be repeated with a larger number of deflections than one. Sharp fringes are then obtained, however, only if successive deflections are equal. This can be achieved by equal increments of force as long as the specimen behaves perfectly elastically and obeys Hooke's law. Such multiple beam holograms accordingly enable zones of overstress to be detected by the lack of sharpness of the fringes.

Another type of change of form which can be investigated is that due to vibration. For the study of vibrations of complicated components, the component is best recorded in its undisturbed state, if only because the fine grained photographic emulsion which must be used in the first stage is slow and exposures measured at least in seconds may be necessary. The fringes between the reconstruction and component can be observed either visually under stroboscopic coherent illumination or photographically using high speed photographic techniques. Where the vibrations are excited electrically, the periodic exciting current can be used also to provide stroboscopic control of the illumination under which the observation is made, either by controlling a shutter or in suitable cases by directly controlling the light source itself.

It should be mentioned that when the image is actually observed rather than photographed, it is desirable to ensure that all light reaching the observer's eye is diffused to avoid risk of harm. Thus in FIG. 1 some protection for the observer's eye would be necessary against the direct light reaching the hologram. A diffusing screen or stopped telescope system as described below could be used.

It can in fact generally be arranged that the part of the beam which would not otherwise be diffused is diffused by a screen. With the type of object constituting the specimen in FIG. 1, that is an object which is straight or flat or of large radius of curvature and diffusely reflecting, the layout can be as in FIG. 3. Here the laser is arranged to act as a point source 21 disposed so that some light passes directly through a screen 22 to fall in suitable directions at oblique incidence on the object 23, while the other part is diffused by the screen and reaches the photographic plate 24 directly. Thus the light reflected and that reaching the plate 24 directly is all diffused. In the case of a specularly reflecting object, the screen could be arranged to diffuse the light on to the object and also the light directly reaching the plate. However when this is done the contrast and therefore the visibility of the fringes is reduced and a stopped telescopic system is preferred.

As previously noted when a test object in the form of a replica or copy is to be compared with the image reconstructed from a hologram of a master object the replica must be sufficiently close in form to the master over the whole of the relevant part of the surface if significant interference effects are to be obtained. There are rare cases where the method of manufacture reproduces detailed irregularities of the surface (one is described below with reference to FIGS. 6 and 7) but as a general rule the comparison of replicas with a master by the present invention can only be effected if the replicas are smooth enough to give a substantial degree of specular reflection. Under sufficiently oblique illumination indeed, satisfactory results may be obtained from surfaces finished by normal machine methods. Any diffuse reflection likely to cause difficulty can usually be stopped off.

One example of a specularly reflecting object in the case of which replicas may be compared with a master is a ground or machined cylindrical metal bar 25 FIG. 4. This can be examined all round by disposing its axis longitudinally between a diffusing screen 26 and the photographic plate 27, the screen being annular and the recorded hologram, also being annular. Viewing may be through a telescopic system. The screen 26 is illuminated by a parallel beam 28 derived from a laser so as to diffuse light on to the object. Such light as travels directly from the screen 26 and through the plate 27 would be brought in focus by the object lens 29 of the telescope. To avoid harm to the observer an opaque stop 31 is provided on the eyepiece 32 at the requisite zone.

The diffusing screen itself may be a hologram made by the same technique as is used in the first stage recording of the object. This may be useful in the case of objects of complicated form. It is not essential, however, and in many cases much simpler methods may be used. For example, for the schemes of FIGS. 3 and 4 it may take the form of a transparent material with fine scratches on it, the scratches diffusing the light, while the spaces between allow it straight through. The proportion of diffused to direct light may be roughly determined by the manner in which the scratching is done.

In FIG. 5 the object is the reverse of that of FIG. 4 i.e., it is a cylindrical bore 41. Here a beam 42 from a laser source is spread by the aid of a lens 43 and at a suitable diameter is collimated by a lens 44. An annular portion of the beam is passed through a conical lens 45 which causes the light to be incident over the whole length of the bore 41 at a constant angle of obliquity. In the centre of the lens 45 is a concave lens 46 which spreads the direct light over the requisite area of the photographic plate 47. The very oblique illumination of the test object here obtained enables useful results to be obtained with a coarse honed surface such as is used in motor-car cylinder liners.

The image could be examined by a stopped telescope system as in FIG. 4 but instead a lens 48 and an annular aperture stop 49 may be used to produce the image in the plane 51 which can be viewed by reflection, so protecting the observer's eye. The stop 49 stops off diffuse light whch might hinder the clarity of the image. Alternatively to the conical lens 45, diffuse illumination as in FIG. 4 could be used with a cylindrical bore, while in FIG. 4 a conical lens could be used to illuminate the object obliquely at constant angle.

An advantage of oblique incidence is that relatively large objects can be examined without difficulties arising in exposure and coherence of the light. It also improves the apparent surface finish because the nearer grazing angle is reached the more specular does the reflection become. A further advantage in the case of the examination of replicas is that if, as in FIG. 4, the rays fall on the object over a range of angles, since the light is monochromatic the sensitivity for different angles differs and clear fringes of maximum contrast will be obtained only if the surface of the replica lies in the surface of the image. In such cases the fringes observed not only indicate departures of form but their contrast also indicates whether the replica has the same absolute dimensions as the original from which the hologram was made. If only a single angle of incidence is employed as in FIG. 5, then the fringes retain good contrast and constant sensitivity but a small change in absolute dimensions is no longer detected.

A final example is the use of a hologram as a simple template for gauging a generally flat surface having a relief pattern for example the surface contours of a coin face. Here as shown in FIG. 6 a photographic plate 61 is set parallel to the test object 62 and the laser beam 63 is directed through the plate towards the object so that the plate is exposed to the direct light passing through it and the light scattered back by the object interferes either with the direct light as in a Lippman photograph or with light reflected from the surface of the plate to form a hologram. To enable the image and object to be observed without obstructing the illumination, as shown in FIG. 7, a semi-transparent reflector 64 is set across the beam suitably at 45°, and the image is observed (or photographed) by reflection, the observer's eye being marked 65. The ratio of light transmitted to that reflected by the reflector 64 should be high to avoid undue attenuation of the light traversing the hologram and to protect the observer. With objects produced with the accuracy usual in coining, this layout can be used for comparing replicas with a master.

As an application of the invention to visual examination of a vibrating object, a loud-speaker cone may be instanced. Thus a hologram is made of the cone at rest and the reconstructed image is superposed on the cone itself. A periodic current used to energise the loud-speaker can then be used also to provide stroboscopic control of the illumination under which the observation is made, either by controlling a shutter or in suitable cases by directly controlling the light source itself.

An argon laser may be used in carrying out the present invention, on account of its high power and photographic effectiveness, but good results have been obtained with a 6,328 A helium neon laser and fine-grained plates sensitive to the colour of the light emitted.

What we claim is:

1. A method for detecting small differences between at least part of the surface form of a test object at the time of detection and a reference surface form to which said part of the surface form of the test object "closely approximates," comprising the operations of:

preparing a hologram representing the reference surface form including exposing a photosensitive medium to coherent light, part of which is in the form of a reference beam and part of which is reflected from at least one object to arrive at the photosensitive medium at a finite angle with respect to the reference beam, simultaneously illuminating with coherent light the hologram and said part of the surface form of the test object, the illumination of the hologram being by means of a beam which arrives at the hologram in the same manner as the reference beam arrived at the photosensitive medium during the preparation of the hologram whereby there is reconstructed a three-dimensional image of the reference surface form, the test object being disposed so that the said image is as nearly as possible superimposed on said part of the surface form of the test object, and the illumination of the test object being such that light reflected from the test object arrives at the hologram in substantially the same manner as the reflected light arrived at the photosensitive medium during the preparation of the hologram, and observing the resultant pattern of interference fringes between said image and the surface of the test object.

2. A method according to claim 1 in which the reference surface form is part of an actual object.

3. A method according to claim 2 in which the test object and the object having the reference form are one and the same object.

4. A method according to claim 2 as applied to a test object having a surface with a substantial degree of specular reflection, in which the object having the reference form is a master object and the test object is a separate object nominally having an identical form to the test object at least in the portion under examination.

5. A method according to claim 4 in which a substantial proportion of the light diffusely reflected by the test object is stopped off.

6. A method according to claim 1 in which the differences in form revealed by the pattern of fringes are evaluated from the spacing and number of fringes and the parameters of the apparatus used.

7. A method according to claim 1 in which the pattern of fringes is photographically recorded.

8. A method according to claim 4 in which said part of the surface form of the test object and the reference surface form are cylindrical, in which during the preparation of the hologram the photosensitive medium is disposed to intersect the axis of the reference surface form beyond one end of the reference surface form and is exposed to coherent light derived from a beam directed substantially in the direction of said axis from beyond the other end of the reference surface form, part of the light arriving directly at the photosensitive medium to constitute the reference beam and part of the light being directed to fall at oblique incidence on the reference surface form whence it is reflected to the photosensitive medium, and in which a similar beam of coherent light is subsequently used to illuminate the hologram and the test object while they are disposed in the same spatial relationship as applied to the photosensitive medium and the reference form during the preparation of the holograms.

9. A method according to claim 8 in which the redirected light is redirected to fall on the reference surface form at a constant angle of incidence.

10. A method according to claim 3 as applied to examination of an object in vibration in which the pattern of interference fringes between the image and object is visually examined under stroboscopic illumination.

11. Apparatus for use in the inspection of a test object having a cylindrical surface which exhibits a substantial degree of specular reflection and which has a form nominally identical to that of a cylindrical surface of a given master object, comprising:
illuminating means for producing from a source of coherent light a pattern of illumination which is distributed substantially symmetrically around an axis and is such that when the test object is disposed with the cylindrical surface in a given position so as to be coaxial with the pattern of illumination some of the light will fall on this surface at oblique incidence and will thence be reflected to a region of a plane lying perpendicular to said axis while some of the light will reach said region directly, optical means enabling observation to be made of the cylindrical surface of the test object by virtue of the light reflected from this surface to said region, and means for positioning in said region a photographic plate on which has been recorded a hologram from which may be reconstituted, by virtue of the light reaching said region directly, an image disposed in said given position of the cylindrical surface of the master object.

12. Apparatus according to claim 11 in which the means enabling observation to be made is a telescope system incorporating a stop in the path of direct light from the source.

13. Apparatus according to claim 11 for inspection of the external surface of a cylinder in which said illuminating means comprises a diffusing screen which allows some light to pass directly through it.

14. Apparatus according to claim 11 for inspection of a cylindrical bore in which the same illuminating means comprises an annular conical lens to direct light at oblique incidence on said surface.

15. A method of determining small differences in position or shape of an object due to successive first and second conditions comprising the steps of, directing coherent light onto the object when subject to the first condition to provide an object-bearing beam from the object, positioning a detector sensitive to said coherent light at a distance spaced from the object and in the path of the object-bearing beam, directing light coherent with said first-named coherent light as a reference beam onto the detector at a finite angle with respect to the object-bearing beam to produce an interference pattern of fringes on the detector by interaction of a wavefront from the first object and the reference beam, illuminating with coherent light the interference pattern and the object when subject to the second condition to produce a virtual image of the object when subject to the first condition so that its wavefront coincides with a wavefront from the object when subject to the second condition, and detecting the differences between the object due to the different conditions by noting the interference fringes resulting from any point where said object varies.

16. A method of determining small differences in position or shape of an object due to successive first and second conditions comprising the steps of:
directing coherent light onto the object when subject to the first condition to provide an object bearing beam from the object,
positioning a detector sensitive to said coherent light at a distance spaced from the object and in the path of the object-bearing beam,
directing reference light coherent with said first-named coherent light onto the detector to produce an interference pattern of fringes on the detector by interaction of a wavefront from the first object and the reference light,
illuminating with coherent light the interference pattern and the object when subject to the second condition to produce a virtual image of the object when subject to the first condition so that its wavefront coincides with a wavefront from the object when subject to the second condition, and
detecting the differences between the object due to the different conditions by noting the interference fringes resulting from any point where said object varies, 17. A method of analyzing the vibrations of an object comprising the steps of:
producing a hologram of the object at rest,
illuminating the hologram and the object with coherent light to produce an image of the object which coincides with said object,
vibrating the object, and
detecting the interference fringes produced by the interaction of wavefronts from the image and the vibrating object.

18. A method of comparing wavefronts of similar objects utilizing the reconstruction of an image of a first object recorded as a hologram produced from a pattern of interference fringes resulting from illuminating the first object with coherent light together with a background of coherent light comprising the steps of:
illuminating the hologram and a similar object with coherent light in the same manner as in the construction of the hologram to produce a virtual image of said first object separated from the real image thereof so that the wavefront of said virtual image coincides with a wavefront from the similar object, and
detecting the difference between said objects by noting interference fringes resulting from any point where said similar object varies from said first object.

19. The method of detecting small displacements of an object resulting from small forces thereon comprising the steps of:
making a hologram of the object while it is stationary comprising the steps of,
directing coherent light from the object against a first surface of a photographic recording medium at a first angle, and
directing a reference coherent light beam, phase related to the light from the object, against the first surface at a second angle,
displacing at least part of the object, making a second hologram of the object in its displaced position comprising the steps of
directing coherent light from the displaced object against the first surface of the hologram recording medium at the first angle, and
directing a reference coherent light beam, phase related to the light from the displaced object, against the first surface of the hologram recording medium at the second angle.

20. A method of determining the difference between similar objects comprising the steps of:
producing a hologram of a first object,
illuminating said hologram and a second similar object with coherent light to produce a virtual image of said first object separated from the real image thereof so that the wavefront of said virtual image coincides with a wavefront from said second object, and
detecting the difference between said objects by noting interference fringes resulting from any point where said second object varies from said first object.

21. A method according to claim 4 as applied to a cylindrical test object in which during the exposure of the hologram and subsequent observation the object is disposed with its axis extending in the same direction as a beam of coherent light which is directed towards one end of the object, part of the light being directed past and parallel to the object and part being redirected to fall on the surface of the object at oblique incidence, the photosensitive medium in which the hologram is recorded being located beyond the other end of the object.

22. A method of determining small differences in position or shape of an object due to successive first and second conditions comprising the steps of:
producing holographic information of an object when subject to the first condition,
producing holographic information of the object when subject to the second condition,
comparing the holographic information obtained under both of said conditions, and
detecting the differences in said holographic information resulting from any point where said object varies.

23. A method of determining differences between similar objects comprising the steps of:
producing first holographic information of a first object,
storing said first holographic information,
producing second holographic information of a second similar object,
comparing the stored holographic information of the first object with the second holographic information of the second object, and
detecting the differences in said first and second holographic information resulting from any point where said second object varies from said first object.

24. A method of measuring small dimensional changes in an object by hologram interferometry, comprising the steps of:
illuminating an object in first and second conditions to form first and second reflected object beams respectively,
generating a reference beam,
combining said first reflected object beam with said reference beam and said second reflected object beam with said reference beam to form individual first and second interference patterns respectively, and
comparing said first and second interference patterns to detect any differences in said interference patterns as a measure of dimensional changes in the object.

25. A method of measuring small dimensional changes in an object by hologram interferometry, comprising the steps of:
illuminating an object in first and second conditions to form first and second reflected object beams respectively,
generating a reference light beam,
combining said first reflected object beam with said reference beam and said second reflected object beam with said reference beam to form individual first and second interference patterns respectively,
producing visual outputs from each of said interference patterns and
comparing said visual outputs to detect any differences in said interference patterns as a measure of dimensional changes in the object.

26. A method of measuring small dimensional changes in an object by hologram interferometry, comprising the steps of:

illuminating an object in a first condition to form a reflected object beam, generating a reference light beam, combining said reflected object beam with said reference beam to form an interference pattern, storing said interference pattern, producing a visual output from said stored interference pattern, illuminating the object in a second condition, and comparing said visual output with a wavefront from said illuminated object in its second condition to detect any differences by noting interference fringes resulting from dimensional changes in the object.

27. A method according to claim 24 in which after an exposure of a photosensitive medium to produce a hologram corresponding to said first condition at least one fresh exposure is made under at least said second condition before the photosensitive medium is processed, whereby a multiple hologram is produced which records diffraction patterns of at least two forms of the object and a pattern of fringes corresponding to the changes in form.

* * * * *